United States Patent
Goff (10) Patent No.: US 11,653,772 B2
(45) Date of Patent: May 23, 2023

(54) INFLATABLE PROTECTIVE RESTING ASSEMBLY

(71) Applicant: Gregory Goff, Micanopy, FL (US)

(72) Inventor: Gregory Goff, Micanopy, FL (US)

(*) Notice: Subject to any disclaimer, the term of this patent is extended or adjusted under 35 U.S.C. 154(b) by 295 days.

(21) Appl. No.: 17/123,196

(22) Filed: Dec. 16, 2020

(65) Prior Publication Data
US 2022/0183476 A1    Jun. 16, 2022

(51) Int. Cl.
A47D 13/06 (2006.01)
A47D 7/00 (2006.01)
A47D 15/00 (2006.01)
E04H 15/20 (2006.01)
H02S 40/38 (2014.01)
E04H 15/10 (2006.01)
H02S 20/30 (2014.01)

(52) U.S. Cl.
CPC ........... A47D 7/005 (2013.01); A47D 15/001 (2013.01); E04H 15/20 (2013.01); E04H 15/10 (2013.01); H02S 20/30 (2014.12); H02S 40/38 (2014.12)

(58) Field of Classification Search
CPC ... E04H 15/10; E04H 15/20; E04H 2015/202; E04H 2015/208; A47D 13/063; A47D 13/06
See application file for complete search history.

(56) References Cited

U.S. PATENT DOCUMENTS

| | | | |
|---|---|---|---|
| 2,878,771 A | 3/1959 | Brewin | |
| 4,819,389 A * | 4/1989 | Kihn | E04H 15/20 52/2.21 |
| 4,876,829 A * | 10/1989 | Mattick | E04H 15/20 135/125 |
| 5,007,212 A * | 4/1991 | Fritts | E04H 15/20 52/2.18 |
| 5,247,768 A * | 9/1993 | Russo | E04H 15/20 52/2.13 |
| 5,487,400 A * | 1/1996 | Dawkins | E04H 15/324 135/124 |
| 5,660,197 A | 8/1997 | Boe | |
| 6,216,291 B1 * | 4/2001 | Eads | A61G 10/00 135/96 |
| 6,708,451 B1 | 3/2004 | Gomes | |
| 7,047,991 B2 * | 5/2006 | Kline | A61G 10/005 135/96 |
| 10,801,231 B1 * | 10/2020 | Ensign | E04H 15/12 |
| 2008/0000513 A1 * | 1/2008 | Yul | H02S 10/40 136/244 |
| 2008/0072945 A1 * | 3/2008 | Grand Pre | E04H 15/10 135/96 |
| 2009/0151242 A1 * | 6/2009 | Kellogg | A01G 13/043 47/29.6 |

(Continued)

Primary Examiner — David R Hare
Assistant Examiner — Ifeolu A Adeboyejo (57) ABSTRACT

An inflatable protective resting assembly for enclosing a child while the child is outdoors includes an inflatable enclosure that is inflatable to define an enclosed resting area for a child. A plurality of screens is each removably attachable to the inflatable enclosure to protect the child from insects and reduce exposure to sunlight. A socket is provided and the socket is coupled to the inflatable enclosure. A plurality of accessory units is each removably attachable to the socket to enhance safety and security of the child when the child is positioned in the enclosed resting area defined by the inflatable enclosure.

14 Claims, 8 Drawing Sheets

(56) References Cited

U.S. PATENT DOCUMENTS

2011/0314747 A1   12/2011  Masey
2016/0286982 A1*  10/2016  Smith .................... A47D 13/06
2019/0357645 A1*  11/2019  Aloumanis ............ A45B 25/18

* cited by examiner

INFLATABLE PROTECTIVE RESTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to protective resting devices and more particularly pertains to a new protective resting device for enclosing a child when the child is resting outdoors.

(2) Description of Related Art Including Information Disclosed Under 37 CFR 1.97 and 1.98

The prior art relates to protective resting devices including a tubular enclosure that is inflatable. The prior art discloses variety of an inflatable tents. Additionally, the prior art discloses an inflatable building. The prior art discloses an inflatable child pen that has a triangular shape.

BRIEF SUMMARY OF THE INVENTION

An embodiment of the disclosure meets the needs presented above by generally comprising an inflatable enclosure that is inflatable to define an enclosed resting area for a child. A plurality of screens is each removably attachable to the inflatable enclosure to protect the child from insects and reduce exposure to sunlight. A socket is provided and the socket is coupled to the inflatable enclosure. A plurality of accessory units is each removably attachable to the socket to enhance the safety and security of the child when the child is positioned in the enclosed resting area defined by the inflatable enclosure.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
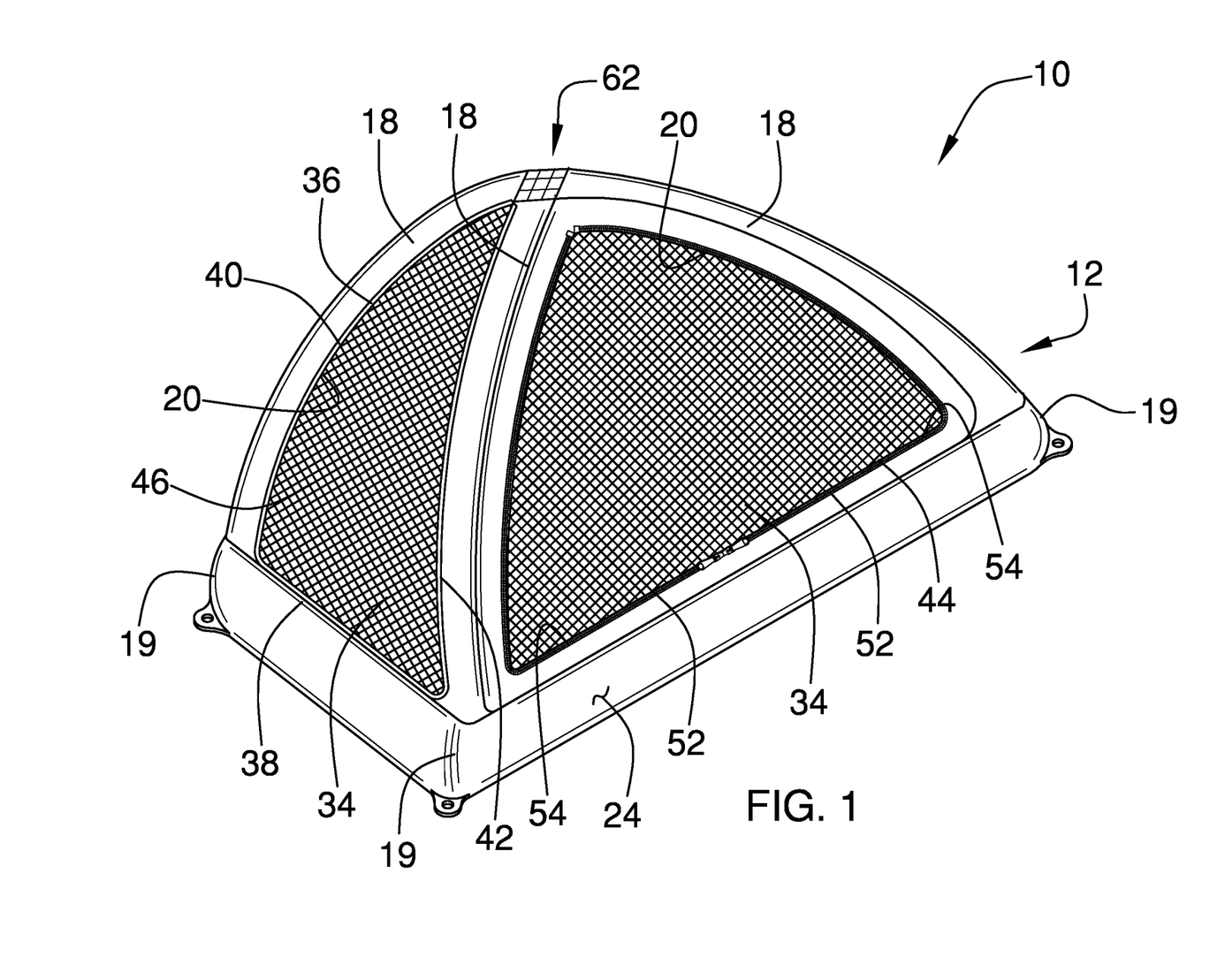
FIG. 1 is a perspective view of an inflatable protective resting assembly according to an embodiment of the disclosure.
Figure 2:
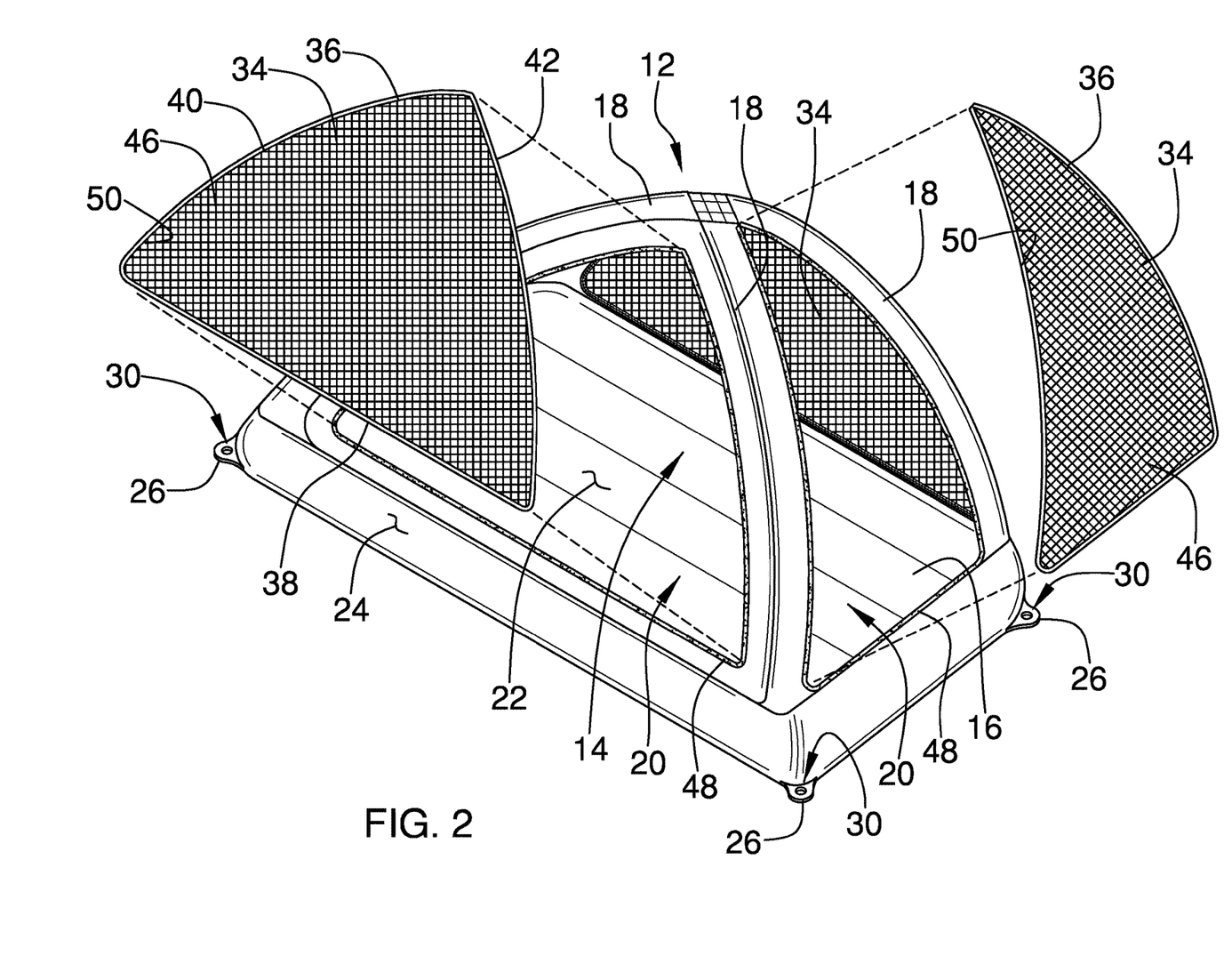
FIG. 2 is an exploded perspective view of an embodiment of the disclosure.
Figure 3:
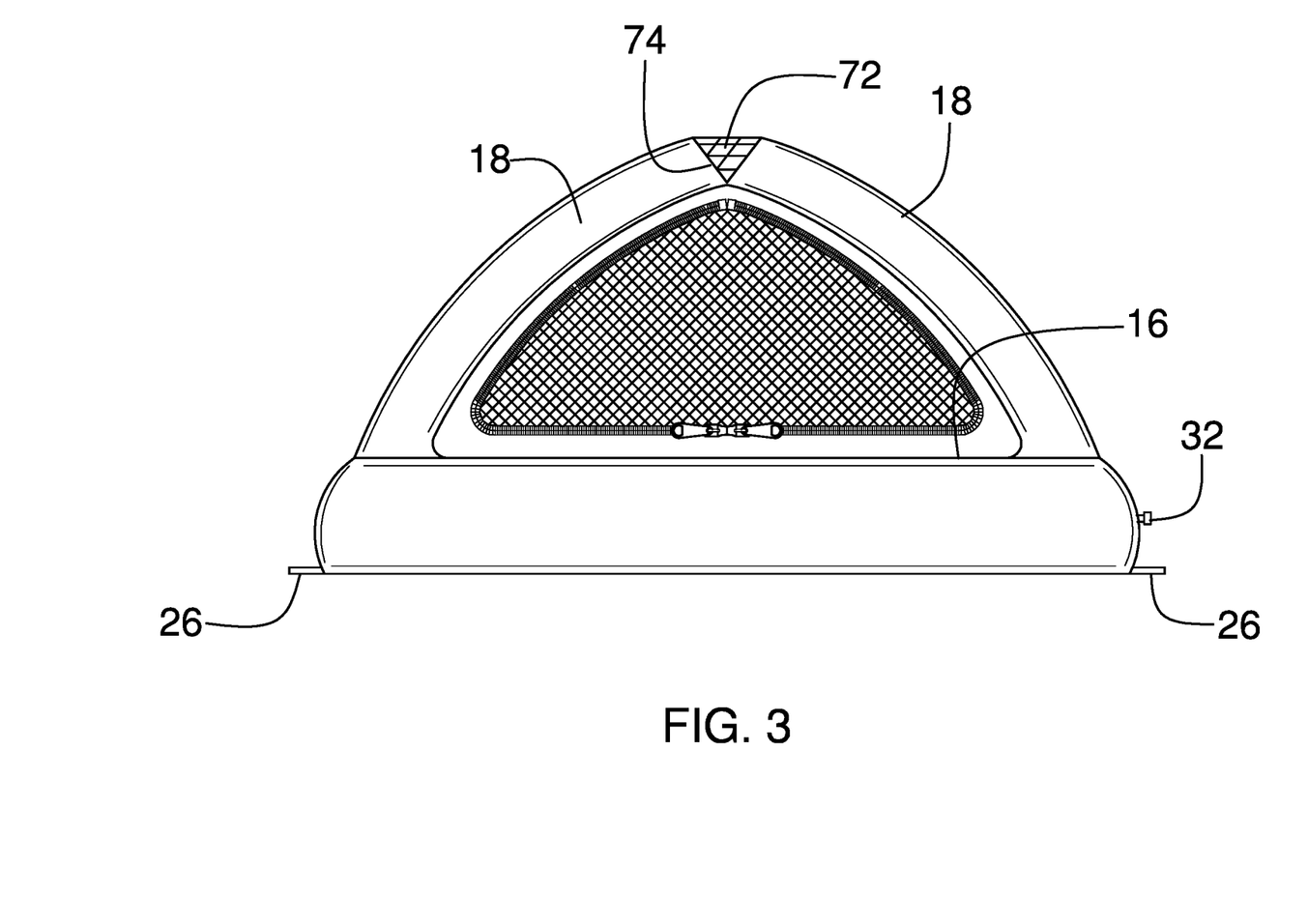
FIG. 3 is a front view of an embodiment of the disclosure.
Figure 4:
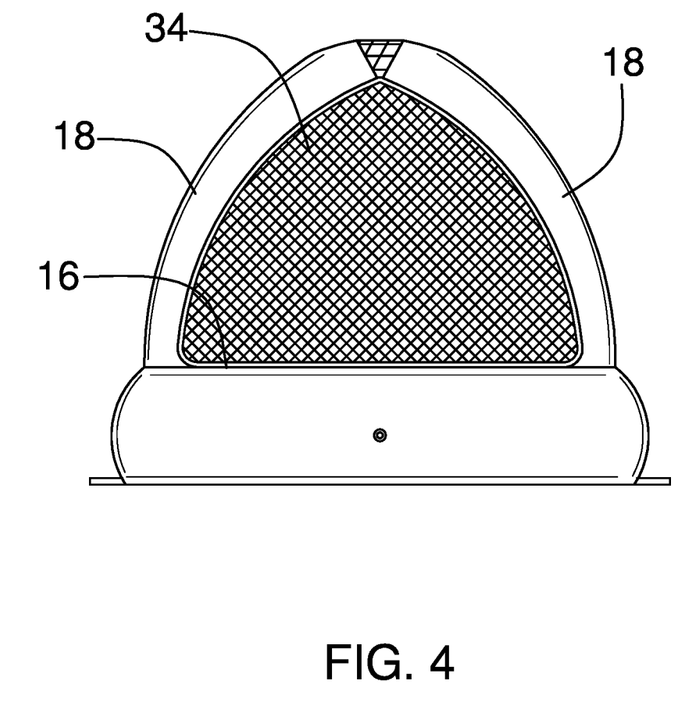
FIG. 4 is a right side view of an embodiment of the disclosure.
Figure 5:
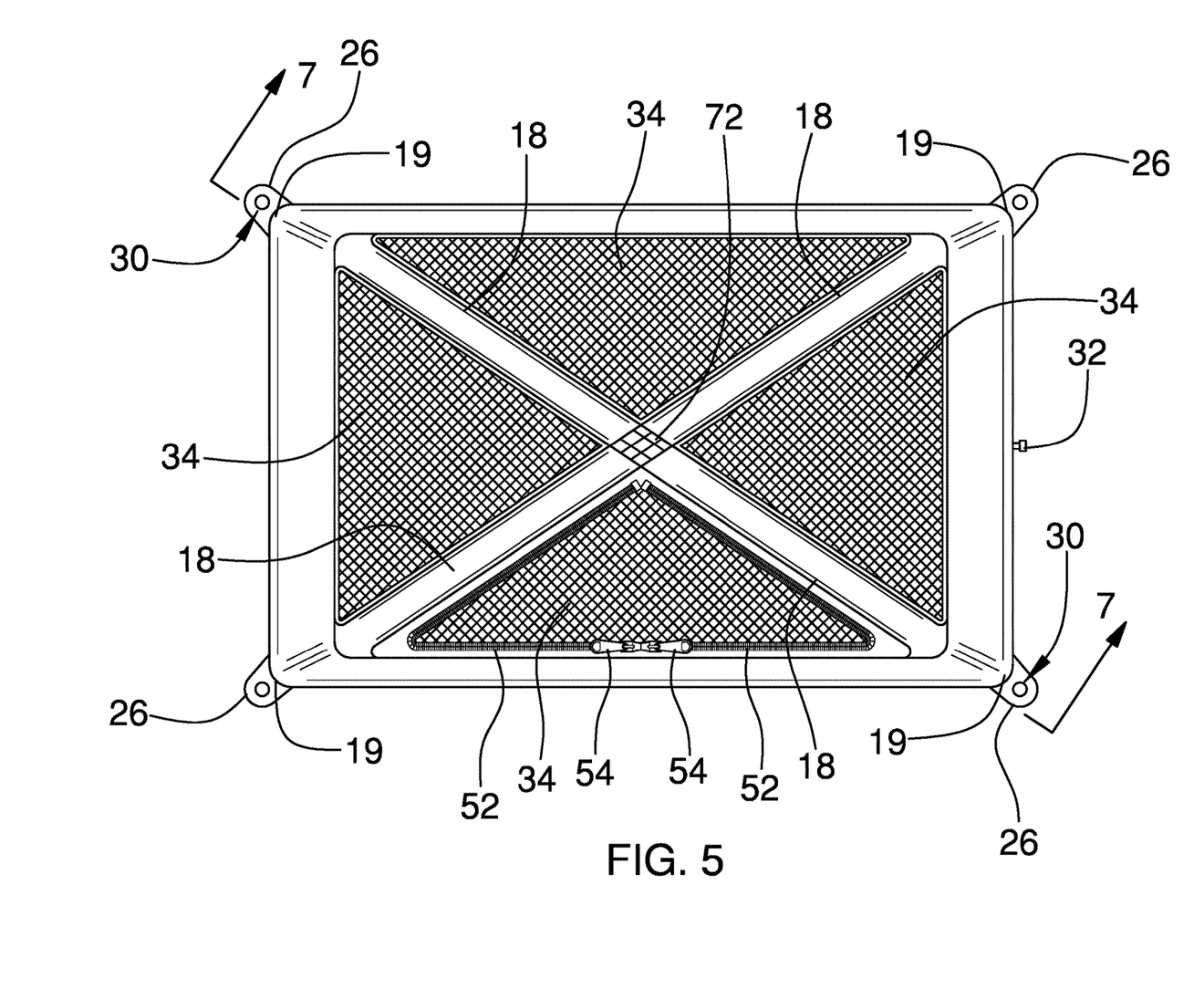
FIG. 5 is a top view of an embodiment of the disclosure.
Figure 6:
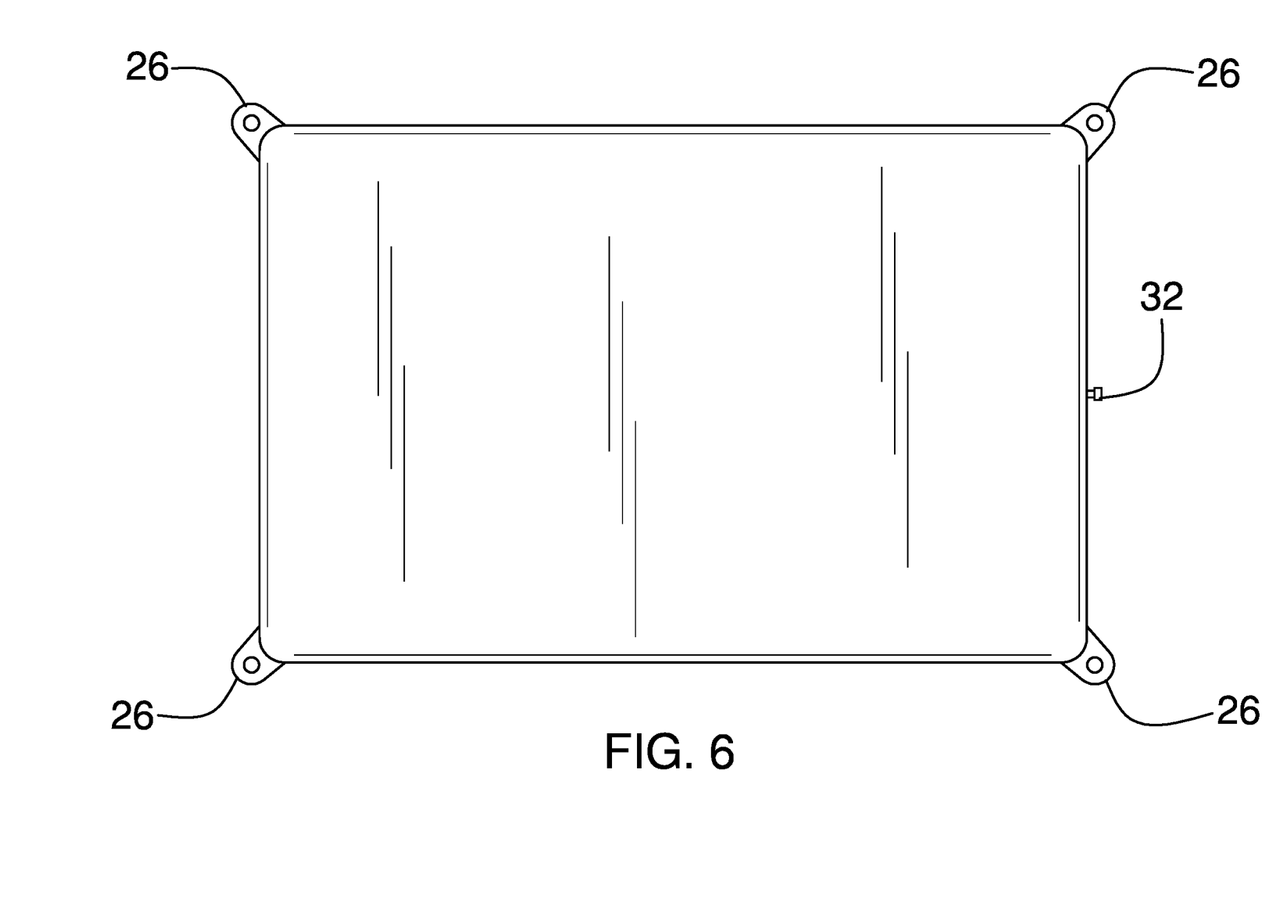
FIG. 6 is a bottom view of an embodiment of the disclosure.
Figure 7:
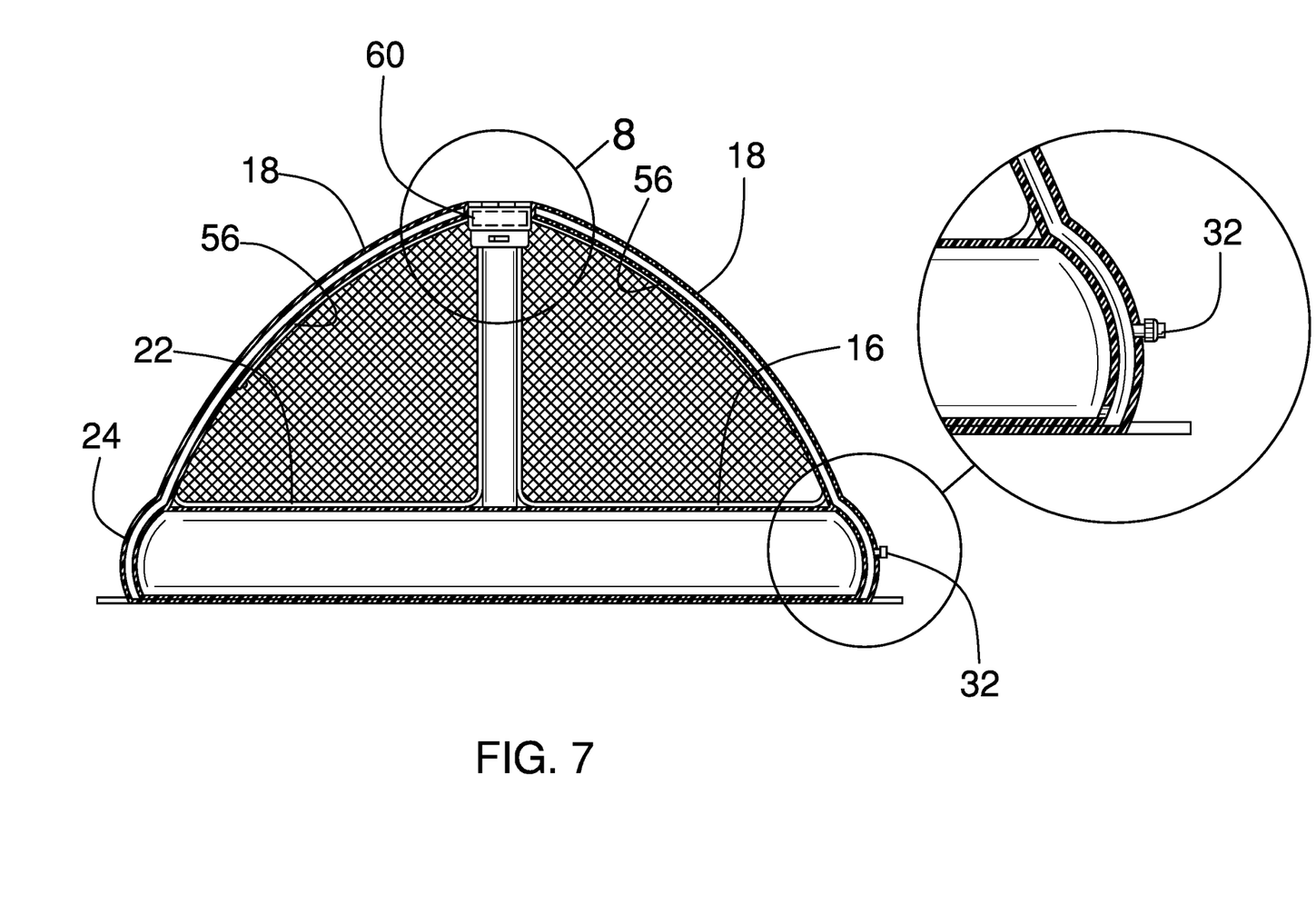
FIG. 7 is a cross sectional view taken along line 7-7 of FIG. 5 of an embodiment of the disclosure.
Figure 8:
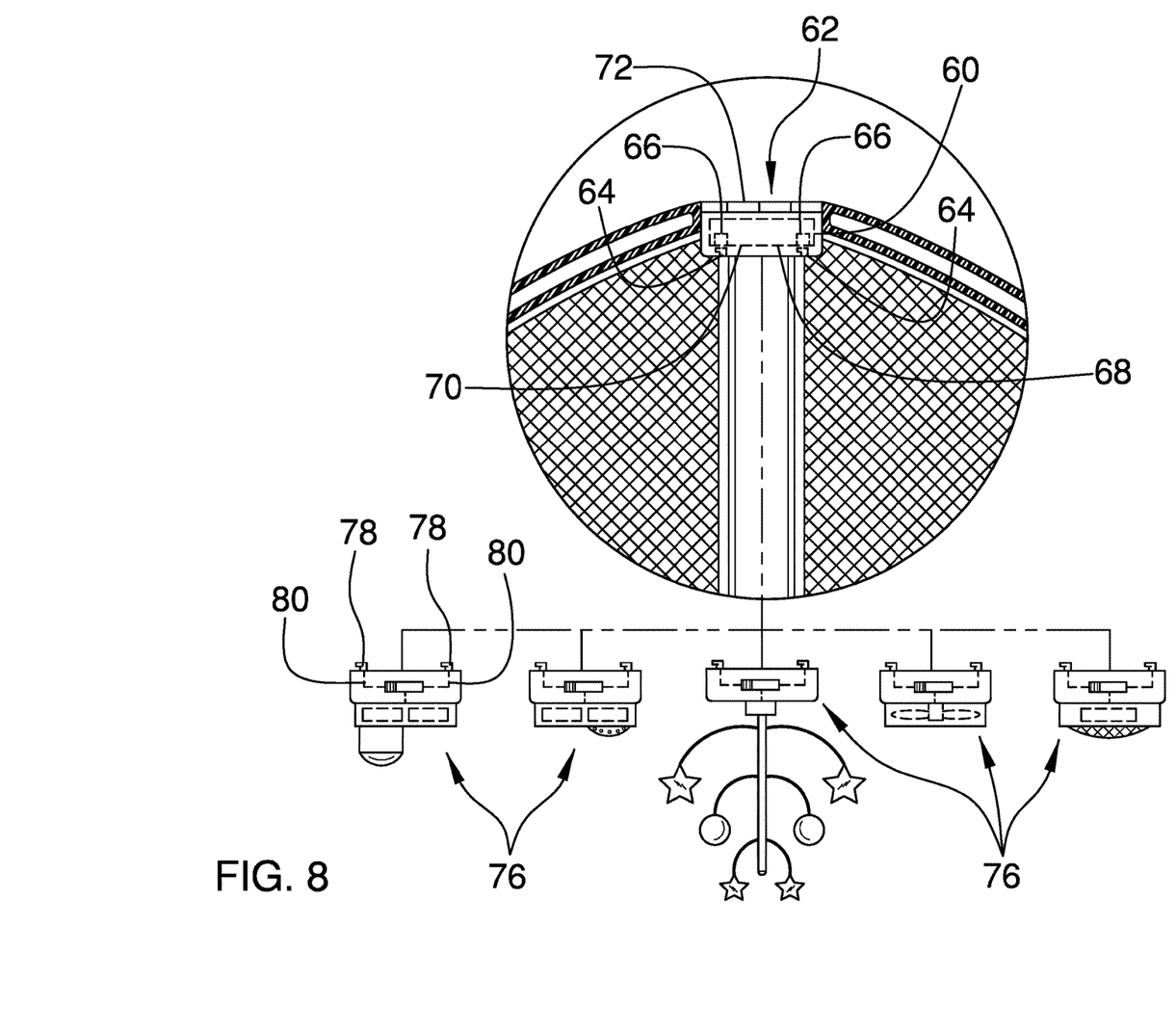
FIG. 8 is a detail view taken from circle 8 of FIG. 7 of an embodiment of the disclosure.

With reference now to the drawings, and in particular to FIGS. 1 through 8 thereof, a new protecting resting device embodying the principles and concepts of an embodiment of the disclosure and generally designated by the reference numeral 10 will be described.

As best illustrated in FIGS. 1 through 8, the inflatable protective resting assembly 10 generally comprises an inflatable enclosure 12 that is inflatable to define an enclosed resting area 14 for a child. The child may be an infant or toddler of up to three years old. The inflatable enclosure 12 can be set up outdoors or indoors at any location. The inflatable enclosure 12 includes a floor 16 and a plurality of members 18 each arcing upwardly from the floor 16, and each of the members 18 intersects at a central point above the floor 16. Each of the members 18 is positioned on a respective one of four corners 19 of the floor 16 such a plurality of openings 20 is defined between respective pairs of the members 18. The unitary construction of the members 18 and the floor 16 facilitate the inflatable enclosure 12 to be easily set up and taken down. Additionally, each of the members and the floor is comprise of a fluid impermeable material to ease cleaning and maintaining the inflatable enclosure 12.

The floor 16 has an upper surface 22 and an outer surface 24, and each of the members 18 extends upwardly from the upper surface 22. Each of members 18 is aligned with the outer surface 24 and the floor 16 is hollow to facilitate the floor 16 to be inflated with air. Each of the members 18 is hollow to facilitate each of the members 18 to be inflated with air. The inflatable enclosure 12 is comprised of a deformable material and the inflatable enclosure 12 is comprised of an air impermeable material. Additionally, an interior of each of the members 18 is in fluid communication with an interior of the floor 16. The inflatable enclosure 12 can be deflated to a sufficiently small size for easy storage when the inflatable enclosure 12 is not in use. Each of the members 18 may have a diameter of approximately 2.0 to 3.0 inches and may extend to a height of approximately 30.0 inches to 36.0 inches when the inflatable enclosure is inflated. Each of the members 18 and the floor 16 may be comprised of a puncture resistant, tear resistant and UV resistant material to enhance the service life of the inflatable material when used outdoors.

A plurality of tabs 26 is each coupled to and extends away from the outer surface 24 of the floor 16 and each of the tabs 26 extends away from the outer surface 24 of the floor 16. Each of the tabs 26 is aligned with a respective one of the four corners 19 of the floor 16. Each of the tabs 26 has an aperture 30 extending therethrough and the aperture 30 in each of the tabs 26 can have an anchor extended therethrough for securing the inflatable enclosure 12 to the ground. The aperture 30 may be defined by a grommet comprised of steel or brass. A valve 32 is integrated into the inflatable enclosure 12 to inflate and deflate the inflatable enclosure 12. The valve 32 is integrated into the outer surface 24 of the floor 16 such that the valve 32 is in fluid communication with the interior of the floor 16. The valve 32 is positionable in an open 12 condition to pass air therethrough and the valve 32 is positionable in a closed condition to inhibit air from passing therethrough.

A plurality of screens 34 is each removably attachable to the inflatable enclosure 12 to protect the child from insects and reduce exposure to sunlight while the child is in the enclosed resting area 14 defined by the inflatable enclosure 12. Each of the screens 34 is comprised of a mesh material to pass air therethrough thereby enabling the child to breathe when the child is in the enclosed resting area 14. Moreover, the mesh material may be comprised of a finely woven material such that insects cannot pass through the mesh material. Each of the screens 34 is comprised of an ultraviolet radiation blocking material to block UVA and UVB radiation from entering the inflatable enclosure. In this way the screens 34 not only protect the child from ultra-violet radiation, but also reduce the temperature within the inflatable enclosure 12 as a result of sunlight. The screens 34 may have indicia printed thereon, such as imagery that is appealing to children. The mesh material may be comprised of an HDPE mesh with 50.0 micron openings to block insects from passing therethrough and the mesh material may have a grey color.

Each of the screens 34 has a perimeter edge 36 and the perimeter edge 36 of each of the screens 34 has a lower side 38, a first sidelong side 40 and a second sidelong side 42. Each of the first sidelong side 40 and the second sidelong side 42 of a respective one of the screens 34 intersects at a point above the lower side 38 of the respective screen 34 such that each of the screens 34 has a triangular shape. Additionally, each of the screens 34 is positionable in a respective one of the openings 20 defined by the members 18, and the plurality of screens 34 includes a first screen 44 and a set of second screens 46. The lower side 38 of each of the screens may have a length of approximately 30.0 inches and each of the first sidelong side 40 and the second sidelong side 42 may have a length of approximately 20.0 inches.

A plurality of first mating members 48 is each of the first mating members 48 is coupled to the inflatable enclosure 12 and each of the first mating members 48 extends around a full perimeter of a respective one of the openings 20 defined by the members 18 and the floor 16. A plurality of second mating members 50 is each coupled to a respective one of the second screens 46. Each of the second mating members 50 extends along a respective one of the lower side 38, the first sidelong side 40 and the second sidelong side 42 of the perimeter edge 36 of the respective second screen 46. Moreover, each of the second mating members 50 releasably engages a respective one of the first mating members 48 for retaining the second screens 46 on the inflatable enclosure 12 to cover a respective one of the openings 20 defined by the members 18 and the floor 16. Each of the first mating members 48 and the second mating members 50 may comprise a hook and loop fastener or the like.

A pair of first fasteners 52 is provided and each of the first fasteners 52 is coupled to the inflatable enclosure 12. Each of the first fasteners 52 extends around a partial perimeter of a respective one of the openings 20 defined by the members 18 and the floor 16. A pair of second fasteners 54 is each coupled to the first screen 44. Each of the second fasteners 54 extends along a respective one of the first sidelong side 40 and the second sidelong side 42 of the first screen 44 and each of the second fasteners 54 extends partially along the lower side 38 of the first screen 44. Each of the first fasteners 52 releasably engages a respective one of the second fasteners 54 for retaining the first screen 44 on the inflatable enclosure 12 to cover the respective opening 20. Each of the first fasteners 52 and the second fasteners 54 may comprise a zipper or other type of releasable, mechanical fastener. The zipper may be comprised of stainless steel, nylon or other durable material that will not degrade from being exposed to the elements.

A socket 60 is coupled to the inflatable enclosure 12, the socket 60 is positioned at an apex 62 at which the plurality of members 18 intersects and the socket 60 is directed toward the floor 16. The socket 60 has a plurality of engagements 64 being integrated therein and the socket 60 has a plurality of contacts 66 that is coupled thereto. A power supply 68 is coupled to the socket 60 and the power supply 68 is in electrical communication with each of the contacts 66. The power supply 68 may be in electrical communication with the power button 58 on each of the light strips 56.

The power supply 68 comprises at least one rechargeable battery 70 that is positioned in the socket 60. The at least one rechargeable battery 70 is electrically coupled to each of the contacts 66 in the socket 60. Additionally, the at least one rechargeable battery 70 is electrically coupled to each of the power buttons 58. The power supply 68 includes a solar panel 72 that is coupled to the inflatable enclosure 12 such that the solar panel 72 is exposed to sunlight. The solar panel 72 is positioned at the apex 62 at which the members 18 intersect and the solar panel 72 is positioned on a top side 74 of the apex 62. Moreover, the solar panel 72 is electrically coupled to the at least one rechargeable battery 70 for charging the at least one rechargeable battery 70. The solar panel 72 may be a 12.0 Volt, 100 mA solar panel with a length and a width of approximately 3.0 inches. The power supply 68 may include a power switch that is electrically coupled between the at least one rechargeable battery 70 and the contacts 66 in the socket 60.

A plurality of accessory units 76 is provided and each of the accessory units 76 is removably attachable to the socket 60 to enhance safety and security of the child when the child is positioned in the enclosed resting area 14 defined by the inflatable enclosure 12. Each of the accessory units 76 includes a pair of couplers 78 and each of the couplers 78 on a respective one of the accessory units 76 releasably engages a respective one of the engagements 64 on the socket 60 for retaining the respective accessory unit 76 in the socket 60. Each of the accessory units 76 includes a pair of contacts 80 and each of the contacts 80 on a respective one of the accessory units 76 is in electrical communication with the contacts 66 on the socket 60 when the respective accessory unit 76 is coupled to the socket 60. The plurality of accessory units 76 may include, but not be limited to, a blower, a motorized mobile, a speaker and white noise generator, a light emitter or other electronic device that is useful for enhancing rest for the child. Additionally, the plurality of accessory units 76 may include, but not be limited to, a microphone, a camera and a wireless transmitter that might be in communication with a personal electronic device to facilitate a caregiver to remotely monitor the child. The accessory units 76 may include a plurality light emitters, such as an LED or the like, for illuminating the interior of the inflatable enclosure 12.

In use, the inflatable enclosure 12 is inflated and the inflatable enclosure 12 is positioned outdoors. The child is positioned in the inflatable enclosure 12 and a selected one of the accessory units 76 can be attached to the socket 60. Each of the screens 34 is attached to the inflatable enclosure 12 to protect the child from insects and from being exposed to ultra-voilet radiation. In this way the child's caregivers can rest assured that the child will be safe and secure when the child is in the inflatable enclosure 12. The light strips 56 can be turned on the illuminate the inflatable enclosure 12 when the inflatable enclosure 12 is employed in a darkened environment. Respective ones of the accessory units 76 can be engaged in the socket 60 for performing a variety of tasks, including blowing air on the child, playing music for the child or remotely monitoring the child.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An inflatable protective resting assembly for defining an enclosed resting area for a child, said assembly comprising:
   an inflatable enclosure being inflatable wherein said inflatable enclosure is configured to define an enclosed resting area for a child, wherein said inflatable enclosure includes a floor and a plurality of members each arcing upwardly from said floor, each of said members intersecting at a central point above said floor, each of said members being positioned on a respective one of four corners of said floor such a plurality of openings is defined between respective pairs of said members;
   a valve being integrated into said inflatable enclosure wherein said valve is configured to inflate and deflate said inflatable enclosure;
   a plurality of screens, each of said screens being removably attachable to said inflatable enclosure wherein each of said screens is configured to protect the child from insects and reduce exposure to sunlight, each of said screens being comprised of a mesh material wherein each of said screens is configured to pass air therethrough thereby enabling the child to breathe when the child is in the enclosed resting area, each of said screens being comprised of a ultra-violet radiation resistant material wherein each of said screens is configured to reduce the child's exposure to ultra-violet radiation;
   a socket being coupled to said inflatable enclosure, wherein said socket is positioned at an apex of said inflatable enclosure at which said plurality of members intersects, said socket being directed toward said floor, said socket having a plurality of engagements integrated therein, said socket having a plurality of contacts being coupled thereto;
   a plurality of accessory units, each of said accessory units being removably attachable to said socket wherein each of said accessory units is configured to enhance the safety and security of the child when the child is positioned in said enclosed resting area defined by said inflatable enclosure;
   a power supply being coupled to said socket, said power supply being in electrical communication with each of said contacts, said power supply comprising:
      at least one rechargeable battery being positioned in said socket, said at least one rechargeable battery being electrically coupled to each of said contacts in said socket; and
      a solar panel being coupled to said inflatable enclosure wherein said solar panel is configured to be exposed to sunlight, said solar panel being positioned at said apex at which said members intersects, said solar panel being positioned on a top side of said apex such that a peripheral edge of said solar panel is flush with an uppermost edge of each of said members arcing upwardly from said floor, said solar panel being electrically coupled to said at least one rechargeable battery for charging said at least one rechargeable battery.

2. The assembly according to claim 1, wherein said floor has an upper surface and an outer surface, each of said members extending upwardly from said upper surface, each of members being aligned with said outer surface, said floor being hollow wherein said floor is configured to be inflated with air, each of said members being hollow wherein each of said members is configured to be inflated with air.

3. The assembly according to claim 1, wherein said inflatable enclosure is comprised of a deformable material.

4. The assembly according to claim 1, wherein said inflatable enclosure is comprised of an air impermeable material, an interior of each of said members being in fluid communication with an interior of said floor.

5. The assembly according to claim 2, further comprising a plurality of tabs, each of said tabs being coupled to and extending away from said outer surface of said floor, each of said tabs extending away from said outer surface of said floor, each of said tabs being aligned with a respective one of said four corners of said floor, each of said tabs having an aperture extending therethrough wherein said aperture in each of said tabs is configured to have an anchor extended therethrough for securing said inflatable enclosure to the ground.

6. The assembly according to claim 2, wherein said valve is integrated into said outer surface of said floor such that said valve is in fluid communication with said interior of said floor, said valve being positionable in an open condition wherein said valve is configured to pass air therethrough, said valve being positionable in a closed condition wherein said valve is configured to inhibit air from passing therethrough.

7. The assembly according to claim 1, wherein each of said screens has a perimeter edge, said perimeter edge of each of said screens having a lower side, a first sidelong side and a second sidelong side, each of said first sidelong side and said second sidelong side of a respective one of said screens intersecting at a point above said lower side of said respective screen such that each of said screens has a triangular shape, each of said screens being positionable in a respective one of said openings defined by said members.

8. The assembly according to claim 1, wherein said plurality screens includes a first screen and a set of second screens.

9. The assembly according to claim 1, further comprising a plurality of first mating members, each of said first mating members being coupled to said inflatable enclosure, each of said first mating members extending around a full perimeter of a respective one of said openings defined by said members and said floor.

10. The assembly according to claim 9, wherein:
said plurality of screens includes a first screen and a plurality of second screens, each of said second screens having a perimeter edge, said perimeter edge of each of said second screens having a first sidelong side, a second sidelong side and a lower side; and
said assembly includes a plurality of second mating members, each of said second mating members being coupled to a respective one of said second screens, each of said second mating members extending along a respective one of said lower side, said first sidelong side and said second sidelong side of said perimeter edge of said respective second screen, each of said second mating members releasably engaging a respective one of said first mating members for retaining said second screens on said inflatable enclosure to cover a respective one of said openings defined by said members and said floor.

11. The assembly according to claim 1, further comprising a pair of first fasteners, each of said first fasteners being coupled to said inflatable enclosure, each of said first fasteners extending around a partial perimeter of a respective one of said openings defined by said members and said floor.

12. The assembly according to claim 11, wherein:
said plurality of screens includes a first screen, said first screen having a lower perimeter edge, said perimeter edge having a first sidelong side, a second sidelong side and a lower side; and
a pair of second fasteners, each of said second fasteners being coupled to said first screen, each of said second fasteners extending along a respective one of said first sidelong side and said second sidelong side of said first screen, each of said second fasteners extending partially along said lower side of said first screen, each of said first fasteners releasably engaging a respective one of said second fasteners for retaining said first screen on said inflatable enclosure to cover said respective opening.

13. The assembly according to claim 1, wherein each of said accessory units includes a pair of couplers, each of said couplers on a respective one of said accessory units releasably engaging a respective one of said engagements on said socket for retaining said respective accessory unit in said socket, each of said accessory units including a pair of contacts, each of said contacts on a respective one of said accessory units being in electrical communication with said contacts on said socket when said respective accessory unit is coupled to said socket.

14. An inflatable protective resting assembly for defining an enclosed resting area for a child, said assembly comprising:
an inflatable enclosure being inflatable wherein said inflatable enclosure is configured to define an enclosed resting area for a child, said inflatable enclosure including a floor and a plurality of members each arcing upwardly from said floor, each of said members intersecting at a central point above said floor, each of said members being positioned on a respective one of four corners of said floor such a plurality of openings is defined between respective pairs of said members, said floor having an upper surface and an outer surface, each of said members extending upwardly from said upper surface, each of members being aligned with said outer surface, said floor being hollow wherein said floor is configured to be inflated with air, each of said members being hollow wherein each of said members is configured to be inflated with air, said inflatable enclosure being comprised of a deformable material, said inflatable enclosure being comprised of an air impermeable material, an interior of each of said members being in fluid communication with an interior of said floor;
a plurality of tabs, each of said tabs being coupled to and extending away from said outer surface of said floor, each of said tabs extending away from said outer surface of said floor, each of said tabs being aligned with a respective one of said four corners of said floor, each of said tabs having an aperture extending therethrough wherein said aperture in each of said tabs is configured to have an anchor extended therethrough for securing said inflatable enclosure to the ground;
a valve being integrated into said inflatable enclosure wherein said valve is configured to inflate and deflate said inflatable enclosure, said valve being integrated into said outer surface of said floor such that said valve is in fluid communication with said interior of said floor, said valve being positionable in an open condition wherein said valve is configured to pass air therethrough, said valve being positionable in a closed condition wherein said valve is configured to inhibit air from passing therethrough;
a plurality of screens, each of said screens being removably attachable to said inflatable enclosure wherein each of said screens is configured to inhibit the child from exiting the enclosed resting area defined by said inflatable enclosure, each of said screens being comprised of a mesh material wherein each of said screens is configured to pass air therethrough thereby enabling the child to breathe when the child is in the enclosed resting area, each of said screens being comprised of an ultra-violet radiation blocking material wherein each of said screens is configured to inhibit the child from being exposed to ultra-violet radiation, each of said screens having a perimeter edge, said perimeter edge of each of said screens having a lower side, a first sidelong side and a second sidelong side, each of said first sidelong side and said second sidelong side of a respective one of said screens intersecting an a point above said lower side of said respective screen such that each of said screens has a triangular shape, each of said screens being positionable in a respective one of said openings defined by said members, said plurality of screens including a first screen and a set of second screens;

a plurality of first mating members, each of said first mating members being coupled to said inflatable enclosure, each of said first mating members extending around a full perimeter of a respective one of said openings defined by said members and said floor;

a plurality of second mating members, each of said second mating members being coupled to a respective one of said second screens, each of said second mating members extending along a respective one of said lower side, said first sidelong side and said second sidelong side of said perimeter edge of said respective second screen, each of said second mating members releasably engaging a respective one of said first mating members for retaining said second screens on said inflatable enclosure to cover a respective one of said openings defined by said members and said floor;

a pair of first fasteners, each of said first fasteners being coupled to said inflatable enclosure, each of said first fasteners extending around a partial perimeter of a respective one of said openings defined by said members and said floor;

a pair of second fasteners, each of said second fasteners being coupled to said first screen, each of said second fasteners extending along a respective one of said first sidelong side and said second sidelong side of said first screen, each of said second fasteners extending partially along said lower side of said first screen, each of said first fasteners releasably engaging a respective one of said second fasteners for retaining said first screen on said inflatable enclosure to cover said respective opening;

a socket being coupled to said inflatable enclosure, said socket being positioned at an apex of said inflatable enclosure at which said plurality of members intersects, said socket being directed toward said floor, said socket having a plurality of engagements integrated therein, said socket having a plurality of contacts being coupled thereto;

a power supply being coupled to said socket, said power supply being in electrical communication with each of said contacts, said power supply being in electrical communication with said power button on each of said light strips, said power supply comprising:

at least one rechargeable battery being positioned in said socket, said at least one rechargeable battery being electrically coupled to each of said contacts in said socket, said at least one rechargeable battery being electrically coupled to each of said power buttons; and     a solar panel being coupled to said inflatable enclosure wherein said solar panel is configured to be exposed to sunlight, said solar panel being positioned at said apex at which said members intersects, said solar panel being positioned on a top side of said apex such that a peripheral edge of said solar panel is flush with an uppermost edge of each of said members arcing upwardly from said floor, said solar panel being electrically coupled to said at least one rechargeable battery for charging said at least one rechargeable battery; and a plurality of accessory units, each of said accessory units being removably attachable to said socket wherein each of said accessory units is configured to enhance safety and security of the child when the child is positioned in said enclosed resting area defined by said inflatable enclosure, each of said accessory units including a pair of couplers, each of said couplers on a respective one of said accessory units releasably engaging a respective one of said engagements on said socket for retaining said respective accessory unit in said socket, each of said accessory units including a pair of contacts, each of said contacts on a respective one of said accessory units being in electrical communication with said contacts on said socket when said respective accessory unit is coupled to said socket.

* * * * *